United States Patent [19]

Cohen et al.

[11] Patent Number: 5,074,633
[45] Date of Patent: Dec. 24, 1991

[54] OPTICAL COMMUNICATION SYSTEM COMPRISING A FIBER AMPLIFIER

[75] Inventors: Leonard G. Cohen, Berkeley Heights; John T. Krause, New Providence; William A. Reed, Summit; Kenneth L. Walker, New Providence, all of N.J.

[73] Assignee: AT&T Bell Laboratories, Murray Hill, N.J.

[21] Appl. No.: 562,768

[22] Filed: Aug. 3, 1990

[51] Int. Cl.$^5$ .............................................. G02B 6/26
[52] U.S. Cl. ........................................ 385/43; 385/96; 359/341
[58] Field of Search ................ 350/96.15, 96.16, 96.20

[56] References Cited

U.S. PATENT DOCUMENTS

| | | | |
|---|---|---|---|
| 3,779,628 | 12/1973 | Kapron et al. | 350/96.15 |
| 3,808,549 | 4/1974 | Maurer | 350/96.15 |
| 4,083,625 | 4/1978 | Hudson | 350/96.15 |
| 4,143,940 | 3/1979 | Khoe | 350/96.15 |
| 4,689,065 | 8/1987 | Krause | 65/2 |
| 4,763,976 | 8/1988 | Nolan et al. | 350/96.15 |
| 4,782,491 | 11/1988 | Snitzer | 350/96.15 X |
| 4,900,114 | 2/1990 | Mortimore et al. | 350/96.15 |
| 4,923,279 | 5/1990 | Ainslie et al. | 350/96.30 |
| 5,011,251 | 4/1991 | Miller et al. | 350/96.20 X |

OTHER PUBLICATIONS

*Electronics Letters*, vol. 22, No. 6, Mar. 13, 1986, "Low-Loss Joints Between Dissimilar Fibers by Tapering Fusion Splices," by P. B. Mortimore and J. V. Wright, pp. 318-319.

*Journal of Lightwave Technology*, LT4, July 1986, "Splice Loss of Single-Mode Fiber as Related to Fusion Time, Temperature, and Index Profile Alteration," by J. T. Krause et al., pp. 837-840.

*Journal of Lightwave Technology*, LT5, No. 9, Sep. 1987, "Low-Loss Fusion Splicing of PCVD-DFSM Fibers," by Werner Zell, Johann A. Becker, Peter K. Bachmann, and W. G. Hermann, pp. 1192-1195.

International Wire & Cable Symposium Proceedings, 1988, "Fusion Splices With Low Loss Between SM-Fibers of Different Types," by W. Stieb and J. Schulte, pp. 569-575.

*Primary Examiner*—Frank Gonzalez
*Assistant Examiner*—Phan T. Heartney
*Attorney, Agent, or Firm*—Martin I. Finston; Eugene E. Pacher

[57] ABSTRACT

Disclosed is an optical communication system comprising at least two optical fibers of dissimilar core sizes, joined by a fusion splice. In one embodiment, the larger-core fiber is a communication fiber, and the smaller-core fiber is an erbium-doped amplifier fiber. A taper region is included adjacent the splice. The diameter of the smaller-core fiber increases within the taper region as the splice is approached along the smaller-core fiber. The taper region is substantially free of constrictions. As a consequence of the taper region, the optical losses associated with the splice are relatively low, even when there is relatively high mismatch between the mode field diameters (at a signal wavelength) in the respective fibers.

4 Claims, 1 Drawing Sheet

OPTICAL COMMUNICATION SYSTEM COMPRISING A FIBER AMPLIFIER

FIELD OF THE INVENTION

The invention relates to the field of optical fiber communication systems including optical fiber amplifiers, and more particularly to those systems that further include connections between dissimilar optical fibers.

BACKGROUND OF THE INVENTION

One useful class of amplifiers that shows promise for signal amplification in optical fiber based communication systems is the class of optical fiber amplifiers. An optical fiber amplifier includes an optical fiber having a core that is doped, inter alia, with active ions, typically ions of a rare earth such as erbium. In order to operate such a fiber amplifier at the highest efficiency, it is desirable to confine the active ion doped region to a relatively narrow diameter. As a consequence, there is great interest in fiber amplifiers having very small cores, for example, cores less than about 3 $\mu$m in diameter, and correspondingly small mode field diameters (MFDs).

Amplifier fibers are disclosed, for instance, in U.S. Pat. No. 4,923,279. See also co-assigned U.S. patent application Ser. No. 467,699, and a recently filed continuation-in-part application thereof, as well as a co-assigned, concurrently filed patent application entitled "System Comprising Er-Doped Fiber," filed for D. J. DiGiovanni et al. and incorporated herein by reference.

In many potential applications, it is envisioned that optical fiber amplifiers will be spliced (i.e., substantially permanently, optically transmissively connected) to standard communication fibers, which exemplarily have a core diameter of about 8.25 $\mu$m and an MFD at 1.55 $\mu$m of about 9.9 $\mu$m.

A standard method for transmissively connecting two lengths of standard communication fiber, referred to as "fusion splicing," involves butting together the prepared ends of two fibers in the presence of a heat source (e.g., a flame or electric arc) such that the fiber ends melt and coalesce. Fusion splices are subject to optical losses, referred to collectively as "splice loss." Various factors have been identified as contributing to splice loss, including lateral offset of the cores, differences in the optical characteristics of the mating fibers, and changes in the refractive index profile that take place during fusion.

When fibers having widely dissimilar MFDs are joined according to the prior art, the mismatch of the mode fields at the location of the splice can result in high splice loss. One technique for mitigating this contribution to the splice loss is described, for example, by D. B. Mortimore and J. V. Wright, "Low-Loss Joints between Dissimilar Fibres by Tapering Fusion Splices," *Electronics Letters*, 22 (13 Mar. 1986), pp. 318-319. This tapering technique involves first making a standard fusion splice and then drawing the softened glass in the vicinity of the splice such that the glass becomes constricted, decreasing the diameter of both the cladding and the core in the vicinity of the splice. This tapered region is said to function as a mode transformer that transforms the optical mode field of one fiber to that of the other with low optical loss. A standard communication fiber has reportedly been joined, with a total splice loss of 0.56 dB, to a fiber having a core diameter of 3.8 $\mu$m and an MFD of 4.34 $\mu$m.

Tapering the joint by drawing the fibers is potentially disadvantageous because, inter alia, certain manufacturing difficulties may attach to that method. That is, when the mating fibers have dissimilar outer cladding diameters (ODs), the fiber having the smaller OD tends to constrict more than the larger-OD fiber, causing an abrupt transition from a relatively highly constricted small fiber into a relatively unconstricted large fiber. This effect tends to defeat the purpose of the taper. A similar effect may occur when the fibers have matched ODs, but because of compositional dissimilarities, one fiber has substantially lower viscosity than the other at the fusion temperature. In such a case, the less viscous fiber may suffer the larger constriction. A further manufacturing difficulty obtains because it is conventional to drive the fiber ends together a small distance past the touching point during fusion. It is possible for a bulge to form in the fiber during that process. Such a bulge is undesirable, but will tend to remain after subsequent drawing of the fibers, because constriction will tend to occur at narrow, rather than thick, portions of the fibers. The avoidance of such bulge formation may entail additional penalties in manufacturing time and cost.

It has been observed that during the formation of fusion splices, the index-altering fiber dopants are capable of diffusion. As a result, the refractive index profiles in the fibers near the splice may be changed, and the splice loss may be affected. This effect is discussed, for example, in J. T. Krause, et al., "Splice Loss of Single-Mode Fiber as Related to Fusion Time, Temperature, and Index Profile Alteration," *Journal of Lightwave Technology*, LT-4, (July 1986), pp. 837-840.

An alternative approach to fusion splicing of fibers, based on this diffusion effect (and here referred to as "diffusion tapering") was reported by, for example, W. Zell, et al., "Low-Loss Fusion Splicing of PCVD-DFSM Fibers," *Journal of Lightwave Technology*, LT-5, (September 1987), pp. 1192-1195. The approach of Zell, et al. does not involve drawing the fibers, and thus it does not involve substantially changing the physical dimensions of the fibers. Instead, this approach involves spreading the smaller of the cores of the (not very dissimilar) mating fibers by diffusing the index-raising dopant during an annealing step after the splice is formed. (The index-lowering dopant of the cladding was also found to diffuse during heating.)

Zell, et al. reported that diffusion tapering was effective in reducing the optical loss in a fusion splice between a depressed cladding, single-mode (DCSM) fiber and a dispersion flattened, single-mode (DFSM) fiber having a smaller MFD than the DCSM fiber. Significantly, the heat treatment reported in that work caused the concentrations of germanium and fluorine dopants, respectively, to exhibit diffusion profiles extending axially from the joint. Each diffusion profile decayed from a negative peak (i.e., a concentration minimum relative to the background concentration at the specific radial position at which the profile was measured) at the joint to 10% of the peak height (relative to the background concentration) within about 0.5 mm.

At a wavelength of 1.3 $\mu$m, a splice loss of 0.30 dB was achieved by Zell, et al. This splice loss was smaller than the theoretical loss in a step joint between the two fibers, and the difference was attributed to diffusion tapering. However, at a wavelength of 1.55 $\mu$m, a somewhat greater loss, 0.35 dB, was observed, and no reduction of loss attributable to diffusion tapering was observed.

In a practical communication system, it is desirable for splices between amplifier fibers and communication fibers to exhibit still smaller losses, e.g., losses smaller than 0.3 dB. The Zell, et al. reference does not disclose a technique that can produce low-loss splices between fibers having drastically different core sizes and MFDs. Indeed, at 1.55 μm, which corresponds approximately to the operating wavelength of erbium amplifiers, Zell, et al. has failed to show any improvement in splice loss by diffusion tapering. Moreover, the improved splice reported there involved a pair of only moderately dissimilar fibers both with relatively large cores, i.e., fibers with respective MFDs of 10.1 μm and 7.6 μm at a wavelength of 1.55 μm. Thus, in particular, Zell, et al. does not suggest the possibility that conventional single mode communication fibers could be spliced, with losses than 0.3 dB, to erbium amplifier fibers having MFDs at 1.55 μm of about 4 μm or less.

A fusion splice made with a combination of drawing and annealing was reported by W. Stieb and J. Schulte, "Fusion Splices with Low Loss between SM-Fibers of Different Types," *International Wire & Cable Symposium Proceedings*, 1988, pp. 569–575. In this work, a splice having a total loss of 0.1 dB was reported between a standard communication fiber and a dispersion-flattened fiber having an MFD of 6.3 μm. Although that method produced a splice having desirable loss characteristics, it is subject to the manufacturing difficulties described above in connection with splices that are constricted by drawing the fibers. In addition, it should be noted that a further manufacturing difficulty attaches because in order to assure that a taper is reproducibly made by drawing the fibers, the temperature to which the glass is heated is generally limited to a narrow range adapted to produce the optimum viscosities in the fused fiber regions. Such a temperature range, although required to produce an appropriate constriction, may not in general be optimal for producing, in addition, a diffused splice.

Thus, practitioners in the art have until now failed to provide a fusion splice that is substantially free of constrictions and that is capable, for operation at about 1.55 μm, of joining a fiber having an MFD greater than about 6 μm to an amplifier fiber having an MFD less than or equal to about 4 μm with a total splice loss less than 0.3 dB.

SUMMARY OF THE INVENTION

The invention involves an optical communication system, intended to operate at one or more signal wavelengths, comprising at least two optical fibers of dissimilar core sizes that are joined by a fusion splice. The fiber having the larger core, typically an optical communication fiber, has an MFD of at least about 6 μm at the signal wavelength. The fiber having the smaller core is an optical amplifier fiber having a core that is doped with optically active ions such that optical signals propagating through it may be amplified by stimulated emission. The optically active ions are typically rare earth ions such as erbium ions. The host glass of the core is silica glass that, in addition to the optically active ions, has been doped with germanium and aluminum. The amplifier fiber has an MFD of at most about 4 μm at the signal wavelength. Associated with the fusion splice is a total splice loss of less than 0.3 dB. Associated with the fusion splice is a taper region comprising a length of the amplifier fiber of about 0.5–5 mm wherein the core diameter increases as the splice is approached along the fiber. The taper region is substantially free of constrictions.

DETAILED DESCRIPTION

For illustrative purposes, a preferred embodiment of the invention will now be described.

Figure 1:
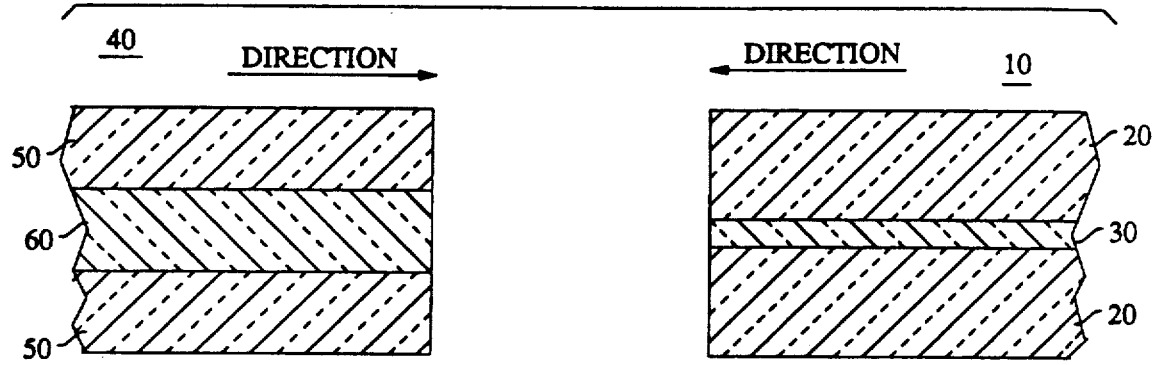
FIG. 1 is a schematic representation, not to scale, of a pair of dissimilar optical fibers to be joined.

With reference to FIG. 1, an optical communication system according to the invention includes an optical amplifier fiber 10. Fiber 10 includes a cladding 20 and a core 30. The system includes a second fiber 40 which is not an amplifier fiber, and which is typically an optical communication fiber. Fiber 40 includes a cladding 50 and a core 60. Fibers 10 and 40 are typically single mode fibers.

Cladding 20 of the amplifier fiber exemplarily comprises silica glass doped with fluorine to a $\Delta^-$ (defined as the refractive index difference between the cladding and pure silica, normalized to the refractive index of pure silica) of about 0.12%. The outer diameter of cladding 20 is advantageously the same as the outer diameter of cladding 50. If fiber 40 is a standard optical communication fiber, then this outer diameter is generally about 125 μm.

The outer diameters of claddings 20 and 50 are preferably the same in order to simplify the task of joining fibers 10 and 40 with a fusion splice. That is, if the respective outer cladding diameters are very dissimilar, surface tension, while acting to align portions of the respective claddings, can as a consequence pull the respective cores out of alignment. This problem is controllable provided the mismatch between the outer diameters of the claddings is less than about 14%.

Core 30 of the amplifier fiber is exemplarily composed of silica glass that is doped with germania and alumina to a $\Delta^+$ (defined as the refractive index difference between the core and pure silica, normalized to the refractive index of pure silica) of about 3.4%. Core 30 is further doped with optically active ions that impart to the fiber the ability to amplify optical signals by stimulated emission. Such ions are generally selected from the group of elements consisting of the rare earths. Additional co-dopants may also be present for the purpose, e.g., of altering the spectral properties of the action ions. Exemplarily, core 30 is doped with erbium ions in the concentration range $10^{17}$–$10^{20}$ ions per cubic centimeter.

Core 30 may be uniformly doped with active ions, e.g., erbium ions. However, to increase the efficiency with which the active ions are pumped, it may be desirable to confine the active ions to only a portion of the core, i.e., from the center of the core out to some maximum radius that is smaller than the radius of the core.

Core 30 is desirably less than about 3 μm in diameter in order to promote efficient pumping of the active ions. Similarly, the MFD of the amplifier fiber at the signal wavelength (exemplarily, 1.55 μm if the fiber is doped with erbium) is also desirably less than about 4 μm.

Other designs of fiber amplifiers are well-known in the art, and are described, for example, in U.S. Pat. No. 4,923,279.

Figure 2:
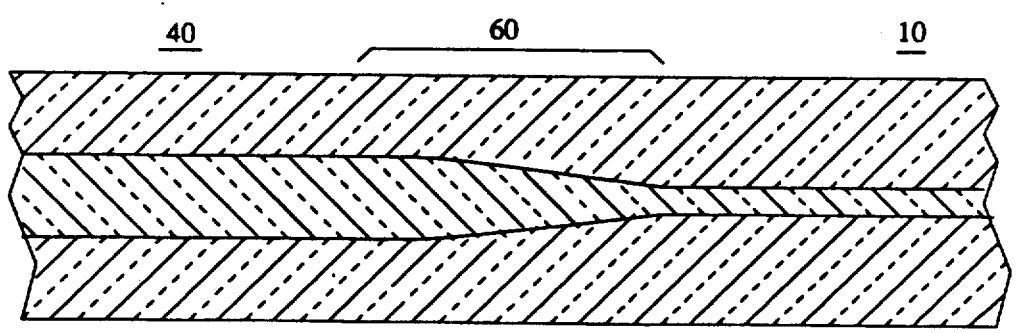
FIG. 2 is a schematic representation, not to scale, of a pair of dissimilar fibers joined by a fusion splice with diffusion tapering of the core in the splice region.

Turning now to FIG. 2, fibers 10 and 40 are joined by a fusion splice 60. It is desirable for the total splice loss associated with splice 60 to be less than 0.3 dB in order to achieve optimum performance in the optical communication system.

For illustrative purposes, one procedure for making fusion splices is described below. Splice losses less than 0.3 dB, and as low as about 0.1 dB, have been achieved by using this procedure to join standard communication fibers to amplifier fibers having a core diameter of about 2.27 μm.

In accordance with the illustrative procedure, the respective ends of fibers 10 and 40 that are to be joined are first prepared and then assembled in a conventional fusion splicing apparatus. (Fusion splicing apparatuses using, e.g., flames, electric arcs, or tungsten filaments as heat sources are well known in the art and are readily commercially available.)

Techniques of end preparation are well known in the art. By the use of such techniques, each of the ends to be joined is desirably cleaved such that it is inclined no more than 1° from a plane perpendicular to the longitudinal axis of the fiber. After the ends are prepared, the fibers are mounted and aligned in the splicing apparatus.

In order to avoid necking down of the splice region due to surface tension effects during fusion, it is desirable to program the splicing apparatus to move the fiber ends together, during fusion, through a predetermined distance (referred to as "stroke") beyond the point at which they touch such that the necking is exactly compensated. Alternatively, it is desirable to move the fiber ends together through a predetermined distance past the touching point before fusion, such that the unheated fibers bow outward from the line along which they have been advanced. The predetermined distance is adapted such that the relaxation and straightening of the fibers during fusion advances the fiber ends together just enough to counteract the effect of necking.

A length of, typically, 0.5-5 mm, including the contact point and portions of both fibers, is then subjected to heat treatment. That is, heat is exemplarily applied by an oxy-hydrogen torch flame. A longer section of fiber can be heated by moving the flame along the fiber. A temperature gradient is produced in the fiber being heated that typically declines from a maximum near 2000° C. to 500° C. over a distance of about 4 mm on each side of the center of the flame. The temperature is within about 10% of the maximum over a total length of, typically, 2-3 mm.

The heat treatment involves the rapid heating of the splice region (i.e., over a length of 0.5-5 mm, as noted) to a peak temperature that lies generally in the range 1700° C.-2000° C., and maintaining the splice region at that temperature for a temperature-dependent time that lies generally in the range 1-200 seconds. That is, when the joint between the fibers is observed microscopically, a point of time can be observed, following the onset of heating, when the fiber ends coalesce and the joint disappears. When the optical loss of the splice is monitored by a conventional technique during the heat treatment, it is generally observed that this loss continues to decrease for a time period following coalescence, eventually reaching a minimum value and then beginning to increase. Thus, an optimum fusion time can readily be identified at a given temperature, such that the splice loss is minimal when the peak temperature is maintained for the optimum time period.

In this regard, reference is usefully made to FIG. 1 of Krause, et al., cited above, which depicts the dependence of splice loss on fusion time, at various temperatures, for joints between pairs of identical fibers of a particular design, namely single mode communication fiber having an outer cladding diameter of 125 μm, a $GeO_2$-$SiO_2$ core having a Δ+ of 0.25% and a depressed index deposited cladding of F-$P_2O_5$-$SiO_2$ with a Δ− of 0.12%. (By Δ+ is meant the refractive index difference between the core and pure silica, normalized to the silica refractive index. Similarly, by Δ− is meant the refractive index difference between pure silica and the cladding portion contiguous to the core, similarly normalized.) From that figure, it is evident that optimum fusion times typical of such a fiber range from about 1 second for a peak temperature of 2000° C. to about 200 seconds for a peak temperature of 1700° C. As explained by J. T. Krause, et al., cited above, diffusion occurs during such an extended heat treatment. As a result, with reference to FIG. 2, the core of fiber 10 tapers out toward the larger core of fiber 40 in splice region 60.

It should be noted in this regard that certain variations of the basic procedure described above are also effective for producing a splice having acceptably low splice loss. For example, after the fiber ends coalesce, the heat source, e.g., a flame or an arc (such as is provided commercially in a conventional splicing machine such as the Alcoa-Fujikura Model FSM-20C are fusion splicer), may be shifted to the side of the joint corresponding to the amplifier fiber (i.e., the fiber having the smaller core).

In another variation, amplifier fiber 10 is alone subjected to heat treatment, without fiber 40. After the heat treatment, both fibers 10 and 40 are aligned in the splicing apparatus and a fusion splice is made in the conventional manner.

EXAMPLE

An erbium-doped, single-mode, amplifier fiber and a single-mode communication fiber were joined by a fusion splice with extended heat treatment to cause diffusion tapering.

The amplifier fiber had a phosphorus and fluorine doped matched cladding with an outer diameter of 125 μm and a core diameter of 2.27 μm. The core was doped with 1000 ppm aluminum, 800 ppm erbium, and 24 mole % germanium to give a Δ of about 2.93%. The MFD at 1.55 μm was about 3.52 μm.

The communication fiber was a dispersion-shifted fiber having a cladding outer diameter of 125 μm and a core diameter of about 6.2 μm. The fiber had a Δ+ of about 0.7% and a Δ− of about 0.12%. The MFD at 1.55 μm was about 6.7 μm.

The fiber ends to be joined were prepared as described above, aligned in a flame fusion splicing apparatus, and butted together to produce a bow as described above. (The alignment was performed optically, by directing light into one of the fibers and, by conventional means, varying the relative positions of the mating fiber ends to maximize transmission between the fibers.)

The radiation power transmitted across the fiber joint was monitored by a conventional technique. A combined length of about 0.6 mm, centered on the contact point, was heated with an oxy-hydrogen flame. The torch that was used is described in U.S. Pat. No. 4,689,065 issued to J. T. Krause on Aug. 25, 1987, and incorporated herein by reference. The torch had three concentric orifices. A hydrogen gas flow at a rate of about 180 cc/minute passed through the central orifice. An oxygen gas flow at a rate of about 0.1 liter/minute passed through the intermediate orifice. An oxygen gas flow at a rate of about 0.7 liter/minute passed through the outer orifice.

The splice region was heated to a peak temperature of about 1800° C., and maintained at that temperature for a time period of about 10 seconds, at which point the maximum power transmission was observed. The resulting splice loss measured in ten samples at a wavelength of 1.31 μm was 0.12 dB, with a standard deviation of 0.02 dB.

We claim:

1. An optical communication system adapted for operation at least at one signal wavelength, comprising:
a first optical fiber, the first fiber being an optical amplifier fiber, the first fiber including a first core that is doped with optically active ions capable of signal amplification by stimulated emission at the signal wavelength; and
a second optical fiber joined to the first fiber, the second fiber having a second core that has a diameter greater than the diameter of the first core, the second fiber further having a mode field diameter at the signal wavelength of at least about 6 μm,
characterized in that
 (a) the second and first fibers are joined by a fusion splice;
 (b) the first fiber has a mode field diameter at the signal wavelength of at most about 4 μm;
 (c) associated with the fusion splice is a taper region comprising a length of first fiber wherein the diameter of the first core increases as the splice is approached along the first fiber, the length of first fiber being at least about 0.5 mm and not more than about 5 mm;
 (d) the taper region is substantially free of constrictions; and
 (e) the fusion splice has a total splice loss at the signal wavelength of less than 0.3 dB.

2. The optical communication system of claim 1, wherein the optically active ions are ions of at least one rare earth element.

3. The optical communication system of claim 1, wherein the optically active ions are erbium ions.

4. The optical communication system of claim 1, wherein the first core has an elemental composition that includes silicon, germanium, and aluminum.

* * * * *